H. H. Beard,
Excavator.
No. 93,796. Patented Aug. 17, 1869.
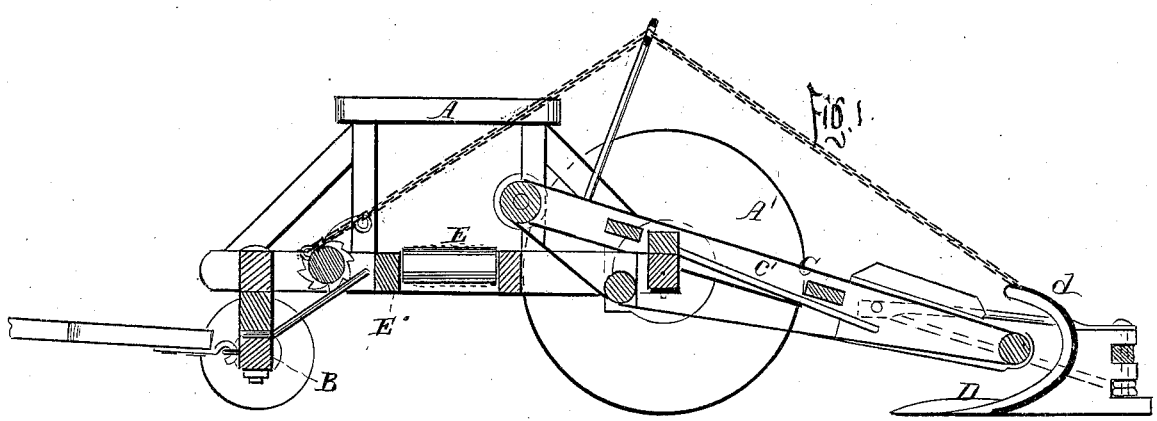
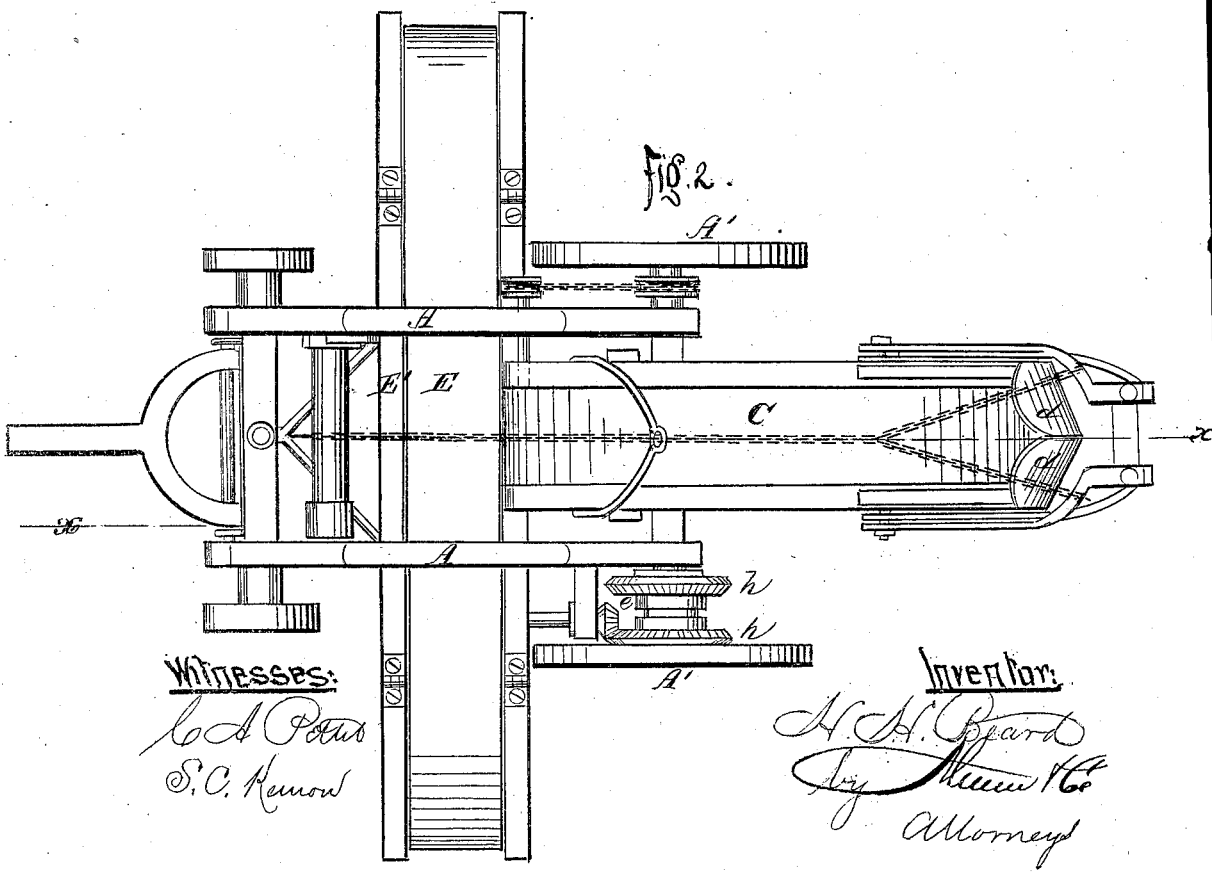

United States Patent Office.

H. H. BEARD, DECEASED, OF FRIAR'S POINT, MISSISSIPPI, (W. J. ST. JOHN, ADMINISTRATOR.)

Letters Patent No. 93,796, dated August 17, 1869.

IMPROVED EXCAVATOR.

The Schedule referred to in these Letters Patent and making part of the same.

*To all whom it may concern:*

Be it known that I, H. H. BEARD, of Friar's Point, in the county of Coahoma, and State of Mississippi, have invented a new and useful Improvement in Excavators; and I do hereby declare that the following is a full, clear, and exact description of the construction and operation of the same, reference being had to the accompanying drawings, making a part of this specification, in which—

Figure 1 is a longitudinal vertical section in the line x x, fig. 2, and

Figure 2 is a plan view.

This invention relates to a machine for ditching and leveeing, in which the soil cut out by the plows is received upon an endless apron, and by that conducted to a second transverse endless apron; and The invention consists in making the said transverse apron in sections, and articulating said sections together, and in using plows of peculiar form.

In the drawings—

A represents the main frame of my machine, mounted upon wheels A' A', and a swivelling forward-axle, B.

From the rear of the frame A extends the frame-work C' of an endless apron, C, and to the rear end of the frame-work C' the plows D D are attached, the same being inclined backward, so that their inner edges are in rear of their outer edges, said inner edges coming nearly or quite in contact.

The plows are also made with concave wings d d, which turn up over the rear extremity of the endless apron C, so as to deliver their cuttings upon it.

The soil received by the apron C is by it conveyed forward, and dropped upon the transverse endless apron E.

This apron is rotated by a shaft, which may be shifted by means of a lever, so as that the small cog-wheel e upon its end may be made to connect with either of the bevel-gears h h, placed in connection with one of the main wheels A', according as it is desired that the endless apron E shall rotate in one direction or the other.

The frame-work E' of the apron E is made in three (more or less) distinct parts, which parts are jointed together, as shown in fig. 2.

This is done in order that if one part is broken it may be replaced, or a longer part may be substituted for a shorter one, and the apron thus be made of any length that may best suit the locality.

The apron may be made in sections also, to correspond with the sections of its frame.

The end sections of the frame and apron may be turned up by the application of suitable mechanism, so as to deliver the soil at points higher than the central part, which it may often be found desirable to do, especially in building levees.

The transverse apron is intended to run at about double the speed of the longitudinal one, so as to keep itself clear, and the weight of the dirt near the centre of the machine.

Having thus described my invention,

What I claim as new, and desire to secure by Letters Patent, is—

The frame-work E', made in sections articulated together, and provided with the apron E, in combination with the frame-work C', provided with the apron C, and with the plows D D placed with respect to each other, as described, all arranged and operating substantially as set forth.

To the above specification of my invention, I have signed my hand, this 24th day of June, 1868.

H. H. BEARD.

Witnesses:
 CHAS. A. PETTIT,
 SOLON C. KEMON.